United States Patent
Accola et al.

(10) Patent No.: US 8,997,108 B2
(45) Date of Patent: *Mar. 31, 2015

(54) ANALYSIS OF OPERATOR GRAPH AND DYNAMIC REALLOCATION OF A RESOURCE TO IMPROVE PERFORMANCE

(71) Applicant: International Business Machines Corporation, Armonk, NY (US)

(72) Inventors: Michael B. Accola, Oakdale, MN (US); John M. Santosuosso, Rochester, MN (US); Brandon W. Schulz, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 84 days.

This patent is subject to a terminal disclaimer.

(21) Appl. No.: 13/679,308

(22) Filed: Nov. 16, 2012

(65) Prior Publication Data

US 2013/0081046 A1    Mar. 28, 2013

Related U.S. Application Data (63) Continuation of application No. 13/034,215, filed on Feb. 24, 2011, now Pat. No. 8,782,656.

(51) Int. Cl.
*G06F 9/50*      (2006.01)
*G06F 11/07*     (2006.01)
*G06F 9/52*      (2006.01)

(52) U.S. Cl.
CPC ............ *G06F 9/5016* (2013.01); *G06F 9/5027* (2013.01); *G06F 9/524* (2013.01); *G06F 11/0793* (2013.01); *G06F 9/5011* (2013.01); *G06F 11/0715* (2013.01)
USPC .......................................... 718/104; 718/105

(58) Field of Classification Search
CPC ........ G06F 9/5077; G06F 9/50; G06F 3/0631
USPC ................................ 718/1, 104, 105; 707/602
See application file for complete search history.

(56) References Cited

U.S. PATENT DOCUMENTS

| | | | |
|---|---|---|---|
| 6,353,844 B1 | 3/2002 | Bitar et al. | |
| 6,871,268 B2 * | 3/2005 | Iyengar et al. | 711/146 |
| 7,093,011 B2 * | 8/2006 | Hirata et al. | 709/223 |
| 2003/0035370 A1 * | 2/2003 | Brustoloni | 370/229 |
| 2007/0091089 A1 * | 4/2007 | Jiao et al. | 345/426 |
| 2007/0271381 A1 | 11/2007 | Wholey et al. | |
| 2008/0034366 A1 * | 2/2008 | Tanaka et al. | 718/1 |
| 2013/0081046 A1 * | 3/2013 | Accola et al. | 718/104 |

* cited by examiner

*Primary Examiner* — Camquy Truong
(74) *Attorney, Agent, or Firm* — Martin & Associates, LLC (57) ABSTRACT

An operator graph analysis mechanism analyzes an operator graph corresponding to an application for problems as the application runs, and determines potential reallocations from a reallocation policy. The reallocation policy may specify potential reallocations depending on whether one or more operators in the operator graph are compute bound, memory bound, communication bound, or storage bound. The operator graph analysis mechanism includes a resource reallocation mechanism that can dynamically change allocation of resources in the system at runtime to address problems detected in the operator graph. The operator graph analysis mechanism thus allows an application represented by an operator graph to dynamically evolve over time to optimize its performance at runtime.

7 Claims, 8 Drawing Sheets

| Reallocation Policy | |
|---|---|
| Problem | Resource Reallocation |
| Compute bound | Increase process priority |
| | Allocate additional CPUs |
| | Increase CPU clock frequency |
| | Use simplified (less accurate) algorithm |
| | Use algorithm that uses more memory |
| Memory bound | Allocate additional memory |
| | Use algorithm that uses more CPU |
| Communication bound | Increase bandwidth |
| | Use dedicated link |
| | Move operator(s) to different node(s) |
| | Change processing to balance traffic |
| Storage bound | Move cache to local SSD |
| | Move cache to high speed SAN |
| | Move cache to in-memory file system |
| | Reduce usage of cache by allocating more CPUs and/or memory |

ANALYSIS OF OPERATOR GRAPH AND DYNAMIC REALLOCATION OF A RESOURCE TO IMPROVE PERFORMANCE

BACKGROUND

1. Technical Field

This disclosure generally relates to computer systems, and more specifically relates to the use of operator graphs in computer systems.

2. Background Art

In known database system, data must be stored, then indexed, then it can be queried or otherwise processed. However, recent advances in stream-based processing provide a new paradigm that allows data to be queried "in flight", before the data is stored in a database file. Stream-based processing is well-suited to a distributed computing environment, which may include parallel processing on many different nodes. Because stream-based processing can require significant resources, implementing stream-based processing in a distributed computing environment allows a programmer to determine which resources are allocated to the different portions of the stream-based processing solution. This allocation of resources is static, which means the programmer manually analyzes the stream-based processing solution at programming time, then allocates resources in the distributed computing environment to different portions of the stream-based processing solution according to the programmer's estimates of what resources are needed where. In the prior art, the allocation of resources in a stream-based processing solution does not change unless the programmer decides to manually change the allocation of resources.

Operator graphs have been developed to represent the function of stream-based processing solutions. An operator graph is a set of processing elements known as operators linked together to form a larger job. In an operator graph, streams of data flow from one operator to the next. Each operator ingests a stream, and may output a stream to a subsequent operator. An operator graph thus allows operators to be fused together to form a larger processing element, akin to many procedures forming a larger program. An operator graph provides a graphical tool that helps to understand how a stream is being processed.

Because streams flow from one operator to the next in an operator graph, a slowdown by one operator can affect many operators upstream. Thus, processing streams of data can produce bottlenecks where a slowdown in one part of the operator graph can negatively impact many other parts of the operator graph. In the prior art, the only solution is for the programmer to go back to the drawing board and redesign the program at programming time to address known problems. Needless to say, taking care of one problem can cause other bottlenecks that were previously undetected to now surface. A programmer at programming time will not be able to adequately anticipate all potential problems, and cannot do anything about transient problems that occur in real-time due to changing conditions.

BRIEF SUMMARY

An operator graph analysis mechanism analyzes an operator graph corresponding to an application for problems as the application represented by the operator graph runs, and determines potential reallocations from a reallocation policy. The reallocation policy may specify potential reallocations depending on whether one or more operators in the operator graph are compute bound, memory bound, communication bound, or storage bound. The operator graph analysis mechanism includes a resource reallocation mechanism that can dynamically change allocation of resources in the system at runtime to address problems detected in the operator graph. The operator graph analysis mechanism thus allows an application represented by an operator graph to dynamically evolve over time to optimize its performance at runtime.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The claims and disclosure herein provide an operator graph analysis mechanism that analyzes an operator graph corresponding to an application for problems as the application represented by the operator graph runs, and determines potential reallocations from a reallocation policy. The reallocation policy may specify potential reallocations depending on whether one or more operators in the operator graph are compute bound, memory bound, communication bound, or storage bound. The operator graph analysis mechanism includes a resource reallocation mechanism that can dynamically change allocation of resources in the system at runtime to address problems detected in the operator graph. The operator graph analysis mechanism thus allows an application represented by an operator graph to dynamically evolve over time to optimize its performance at runtime.

Figure 1:
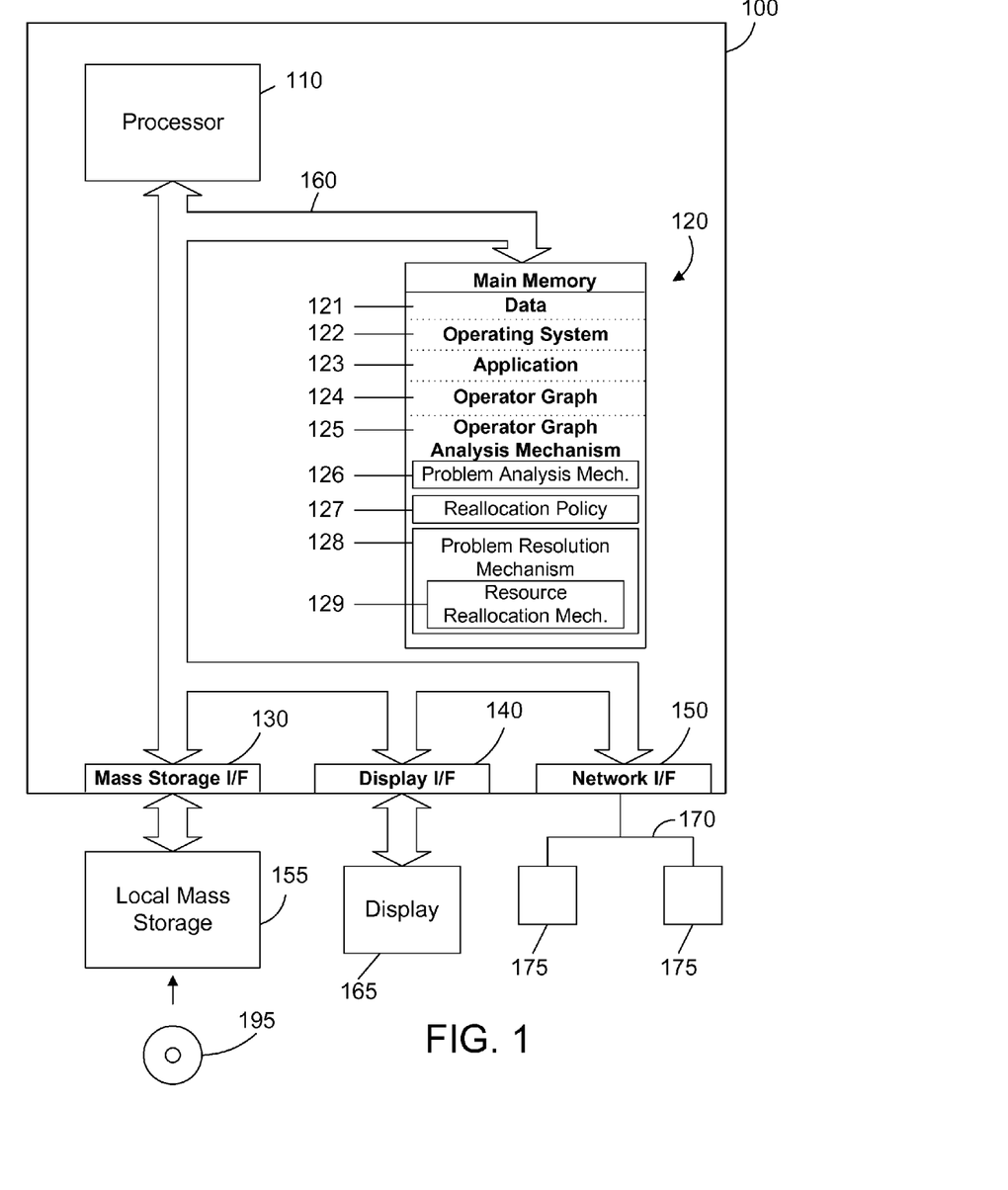
FIG. 1 is a block diagram of an apparatus that includes an operator graph analysis mechanism that detects at runtime problems in an operator graph and performs one or more resource reallocations to address the runtime problems.

Referring to FIG. 1, a computer system 100 is one suitable implementation of a computer system that includes an operator graph analysis mechanism. Computer system 100 is an IBM eServer System x computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195.

Main memory 120 preferably contains data 121, an operating system 122, an application 123, an operator graph 124, and an operator graph analysis mechanism 125. Data 121 represents any data that serves as input to or output from any program in computer system 100. Operating system 122 is a multitasking operating system. Application 123 is representative of any computer program that may be represented in an operator graph. One suitable type of program that may be represented in an operator graph is an application that processes streaming data. Operator graph 124 is a graphical representation of the application 123 that indicates flow of data in the application 123. The operator graph is static in the sense of showing operators and data paths when the application is not running, but is also dynamic because it displays actual data flow when the application runs, which allows identifying bottlenecks in the operator graph 124 in real-time. The operator graph analysis mechanism 125 includes a problem analysis mechanism 126, a reallocation policy 127, and a problem resolution mechanism 128. The problem analysis mechanism 126 analyzes the operator graph 124, and determines when the operator graph indicates a problem in the runtime performance of the application 123. The reallocation policy 127 specifies potential problems along with potential reallocations that could be performed to address those problems. There may be a single reallocation policy that applies to all operators in an operator graph, or in the alternative there may be multiple reallocation policies that apply to different portions of the operator graph. Yet another alternative is to provide a reallocation policy for each operator in the operator graph. The problem resolution mechanism 128 determines from the problem analysis mechanism 126 what problems exist in the operator graph 124, and determines from the reallocation policy 127 potential reallocations. The problem resolution mechanism 128 includes a resource reallocation mechanism 129 that performs one or more reallocations of resources in an attempt to resolve one or more of the problems detected by the problem analysis mechanism 126. The reallocation of resources is discussed in more detail below with reference to FIG. 3.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, application 123, operator graph 124, and operator graph analysis mechanism 125 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the application 123 and the operator graph analysis mechanism 125.

Although computer system 100 is shown to contain only a single processor and a single system bus, those skilled in the art will appreciate that an operator graph analysis mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
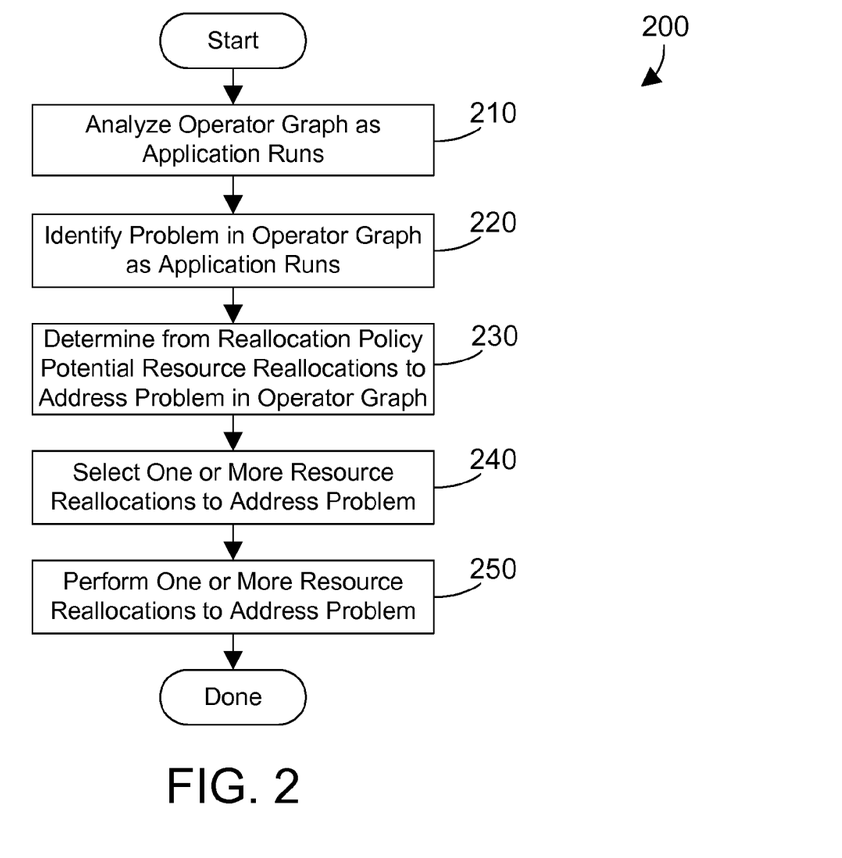
FIG. 2 is a flow diagram of a method for using an operator graph to dynamically reallocate resources at runtime to address one or more problems in the operator graph.

Referring to FIG. 2, a method 200 analyzes an operator graph as the application corresponding to the operator graph runs (step 210). One or more runtime problems are identified in the operator graph as the application runs (step 220). The reallocation policy is then read to determine one or more potential resource reallocations to address the problem in the operator graph (step 230). One or more resource reallocations are selected from the reallocation policy to address the problem (step 240). The one or more resource reallocations are then performed dynamically to address the problem (step 250). The combination of the operator graph and the reallocation policy are used to identify problems and fix problems at runtime by performing resource reallocation at runtime.

Figure 3:
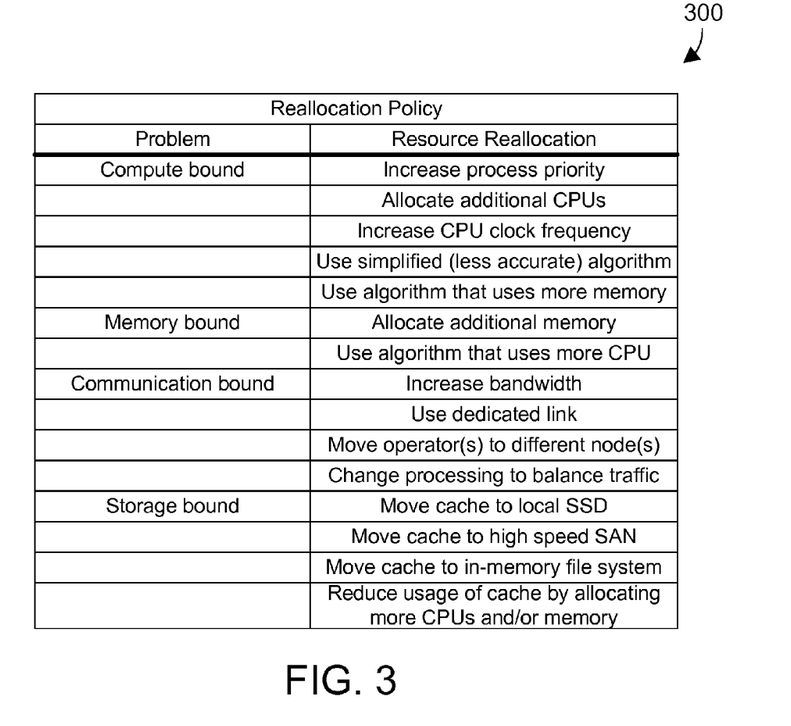
FIG. 3 is a sample reallocation policy showing problems and potential resource reallocations that could be used to address those problems.

A sample reallocation policy 300 is shown in FIG. 3. Reallocation policy 300 is one suitable example for reallocation policy 127 shown in FIG. 1, and is preferably defined by a human user or programmer. Reallocation policy 300 includes four categories of problems, namely compute bound, memory bound, communication bound, and storage bound. Each category includes potential resource reallocations that could be used to help the problem. Thus, when an operator is compute bound, the process priority for the operator can be increased, additional CPUs may be allocated to the operator, the clock speed of one or more CPUs in the operator may be increased, a simplified, less accurate algorithm in the operator could be used, and an algorithm that uses more memory and less CPU could be used. When an operator is memory bound, additional memory could be allocated, or an algorithm that uses more CPU and less memory could be used. When a problem is a communication bottleneck between two operators, meaning a network connection is communication bound, the bandwidth between the two operators could be increased, a dedicated link could be used between the two operators, one or more operator could be moved to a different node in the hardware configuration, and changes to processing could be made to balance the network traffic. When a problem is because an operator is storage bound, meaning excessive cache misses in an internal cache or disk contention is causing a performance problem, the cache could be moved to a local solid state drive (SSD), the cache could be moved to a high speed storage area network (SAN), the cache could be moved to an in-memory file system, or the usage of the cache could be reduced by allocating more CPUs and/or more memory to the operator.

The potential resource reallocations shown in FIG. 3 are shown by way of example, and are not limiting. The disclosure and claims herein expressly extend to any suitable reallocation of a resource that may affect the performance of the application represented by the operator graph. Note the resource reallocations in FIG. 3 may be classified according to type. One suitable type of resource reallocation is hardware reallocation. The allocation of additional CPUs, increasing CPU clock frequency, allocating additional memory, increasing bandwidth of a network connection, using a dedicated link, moving cache to a local SSD, moving cache to a high speed SAN, moving cache to an in-memory file system, and reducing usage of cache by allocating more CPUs and/or memory are all hardware reallocations. A second type of resource reallocation is operating system reallocation. Increasing process priority, using a simplified, less accurate algorithm, using an algorithm that uses more memory, using an algorithm that uses more CPU, and moving operators to different nodes are all operating system reallocations. A third type of resource reallocation is network reallocation. Increasing bandwidth and using a dedicated link are network reallocations. A fourth type of resource reallocation is storage reallocation. Moving cache to local SSD, moving cache to a high speed SAN, and moving cache to an in-memory file system are storage reallocations. Note that some of potential resource reallocations shown in FIG. 3 have more than one type. Thus, increasing bandwidth of a network connection is both a hardware reallocation and a network reallocation. Moving cache to a local SSD, to a high speed SAN, or to an in-memory file system are both hardware reallocations and storage reallocations.

The reallocation policy 300 may include any suitable way to select an appropriate resource reallocation. For example, the resource reallocations could be listed in an order of preference, which would cause the potential resource reallocation at the top of the list to be selected, when possible, to address a given problem. In the alternative, any suitable heuristic could be used to select a suitable resource reallocation. For example, when an operator is compute bound, a selection of the potential resource reallocations in the reallocation policy could be made based on whether additional CPUs are available, whether the clock frequency of any CPUs in the operator may be increased, whether a simpler algorithm exists, and whether an algorithm that uses more memory exists. When multiple potential resource reallocations could be performed, any suitable heuristic could be used to select one or more of the resource reallocations to address the problem in the operator graph.

There may be a single global reallocation policy, such as 300 in FIG. 3, that is used when any problem in an operator graph is encountered. In the alternative, there could be multiple reallocation policies. For example, if eight different operators are distributed across three separate compute nodes in a distributed computing system (see FIG. 6), there could be three separate reallocation policies, one for each compute node. Thus, if a first compute node includes several spare CPUs that are not being used, a preferred reallocation in the reallocation policy for the first compute node might be to allocate additional CPUs. If a second compute node includes lots of unallocated memory, a preferred reallocation in the reallocation policy for the second compute node might be to allocate additional memory. If a third compute node includes a local solid state drive (SSD), a preferred reallocation in the reallocation policy for the second compute node might be to move a cache to the local SSD. This simple example shows multiple reallocation policies could be defined and used in conjunction with an operator graph. In yet another implementation, a reallocation policy could be defined for each operator in the operator graph. When reallocation for an operator is needed, the reallocation policy for that operator could define the potential resource reallocations for that operator. The disclosure and claims herein expressly extend to any suitable number of reallocation policies used in conjunction with an operator graph to define potential reallocations for one or more problems in the operator graph.

Figure 4:
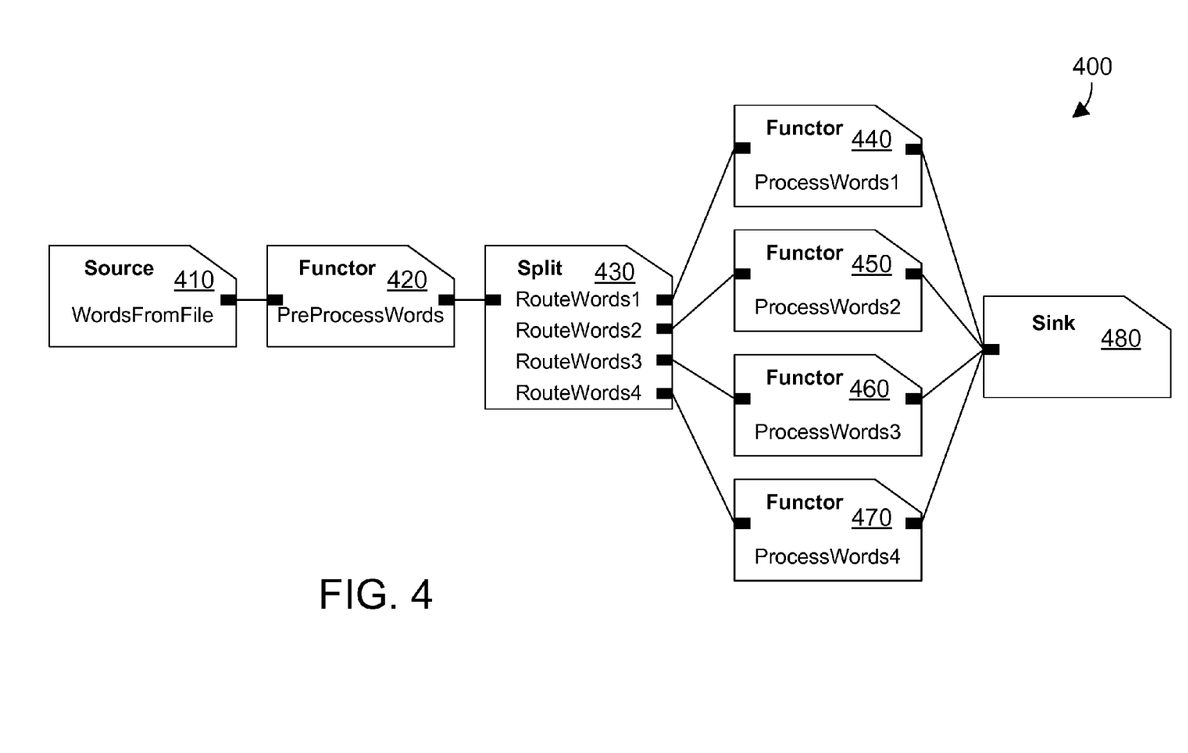
FIG. 4 is a first sample operator graph.

An operator graph 400 is shown in FIG. 4 for a simple application that processes a stream of words from a file. The operator graph 400 includes multiple operators connected by lines. Each of the operators with the exception of the Source operator 410 receives (or ingests) data from a previous operator. Each of the operators with the exception of the Sink operator 480 outputs data to a following operator. The lines between operators represent the flow of data in the operator graph. The source operator 410 includes words from the file to be processed. The Functor operator 420 receives the words from the source operator 410, preprocesses the words, and sends the preprocessed words to the Split operator 430. The Split operator 430 receives the preprocessed words from the Functor operator 420, and routes some of the words to Functor operator 440, some of the words to Functor operator 450, some of the words to Functor operator 460, and some of the words to Functor operator 470. Each Functor operator 440, 450, 460 and 470 receives words from the Split operator 430, and sends the processed words to the sink operator 480.

We now assume the application represented by the operator graph 400 is run. While the application runs, the operator graph indicates state of each operator. We assume for this example Functor operator 440 is performing some complex processing on incoming words that takes more time than the other Functor operators 450, 460 and 470. Because Functor operator 440 is the "bottleneck", once back pressure fills the buffers in the Split operator 430, processing in the Functor operator 420 will begin to back up. At this time, none of the downstream operators 450, 460, or 470 will receive words to process, even though they are not busy. We assume for this example Functor operator 440 is compute bound. The reallocation policy 300 shown in FIG. 3 shows several options for reallocation when an operator is compute bound. The process priority for the Functor operator 440 may be increased. Additional CPUs could be allocated to the Functor operator 440. The clock frequency for one or more CPUs in Functor operator 440 could be increased, assuming the processors and clock hardware support this function. The operating system could replace the algorithm in the Functor operator 440 with a simplified algorithm that is faster, but less accurate, assuming the accuracy is still sufficient. The operating system could also replace the algorithm in the Functor operator 440 with an algorithm that uses more memory and less CPU. One of these potential reallocations specified in the reallocation policy could be performed, or more than one could be performed. If Functor operator 440 is memory bound, a review of the reallocation policy 300 in FIG. 3 shows additional memory could be allocated to the Functor operator 440. The operating system could also replace the algorithm in the Functor operator 440 with an algorithm that uses more CPU and less memory. By monitoring conditions in the operator graph 400 as the application runs, the operator graph analysis mechanism 125 in FIG. 1 can detect when problems occur, and by reading one or more reallocation policies, can make resource reallocations to improve the performance of the application.

Figure 5:
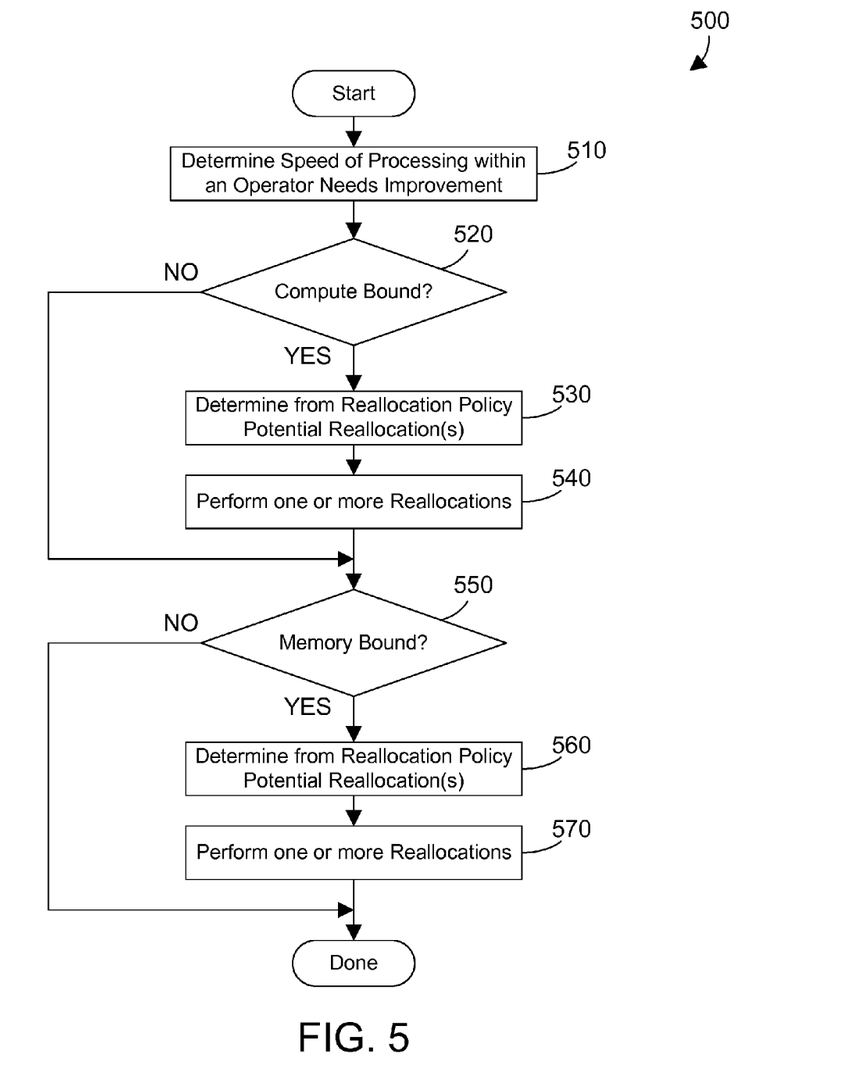
FIG. 5 is a flow diagram of a method that performs one or more reallocations when speed of processing within an operator needs improvement.

Referring to FIG. 5, a sample method 500 begins by determining the speed of processing within an operator needs improvement (step 510). When the operator is compute bound (step 520=YES), determine from the reallocation policy potential reallocations (step 530), and perform one or more of those reallocations (step 540). When the operator is not compute bound (step 520=NO), steps 530 and 540 are bypassed. When the operator is memory bound (step 550=YES), determine from the reallocation policy potential reallocations (step 560), and perform one or more of those reallocations (step 570). When the operator is not memory bound (step 550=NO), steps 560 and 570 are bypassed.

Figure 6:
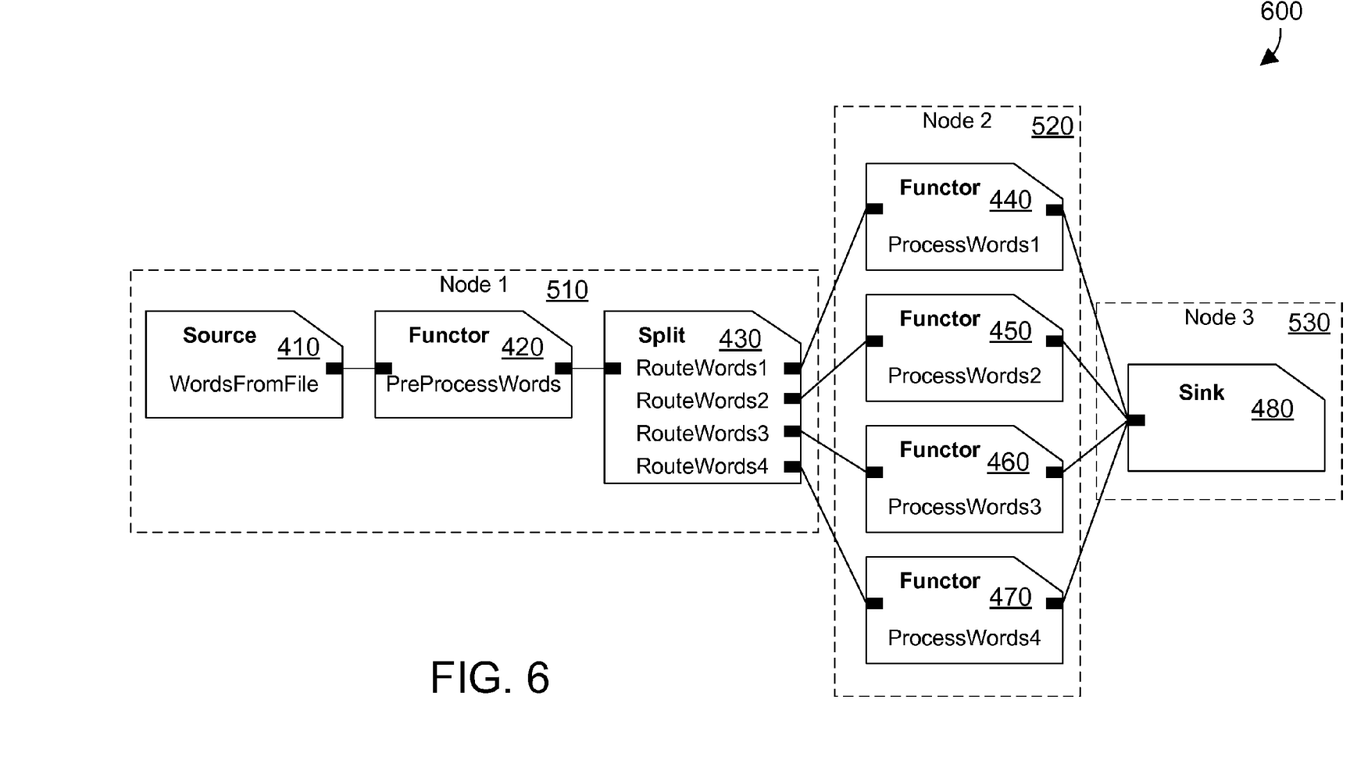
FIG. 6 is a second sample operator graph showing allocation of operators to nodes in a distributed computing system.

A second operator graph 600 is shown in FIG. 6. Operator graph 600 includes the same operators shown in FIG. 4, but these operators are assigned to different nodes in a distributed processing system. Thus, Node 1 510 includes Source operator 410, Functor operator 420, and Split operator 430. Node 2 520 includes Functor operators 440, 450, 460 and 470. Node 3 530 includes the Sink operator 480. We now assume the link between the Split operator 430 on Node 1 510 and the Functor operator 440 on Node 2 550 becomes a bottleneck as the application runs. Once back pressure fills the buffers in the Split operator 430, processing in the Functor operator 420 will begin to back up. At this time, none of the downstream operators 450, 460, or 470 will receive words to process, even though they are not busy.

A review of the reallocation policy 300 in FIG. 3 shows several options when the operator graph is communication bound. The bandwidth of the network connection that connects Split operator 430 to Functor operator 440 can be increased. There are various different ways to increase bandwidth of a network connection. For example, separate Ethernet channels can be bonded together to increase bandwidth. A faster network could be used, such as a 10 gigabit (GB) network, or an InfiniBand network. A dedicated link could also be allocated for the network that connects Split operator 430 to Functor operator 440. In addition, operators could be moved to eliminate the network bottleneck. For example, the Functor operator 440 could be moved from Node 2 520 to Node 1 510. Another alternative is to move the Split operator 430 from Node 1 510 to Node 2 520. Yet another alternative is to move Functor operators 450, 460 and 470 from Node 2 250 to a new node, leaving all the resources in Node 2 520 available to Functor operator 440. Still another alternative is to change the processing of the Split operator 430 to better balance network traffic between the Split operator 430 and the Functor operators 440, 450, 460 and 470 to reduce the bottleneck between the Split operator 430 and the Functor operator 440. The operator graph analysis mechanism will choose one or more of these potential reallocations, and performs one or more reallocations to improve the performance of the application.

Figure 7:
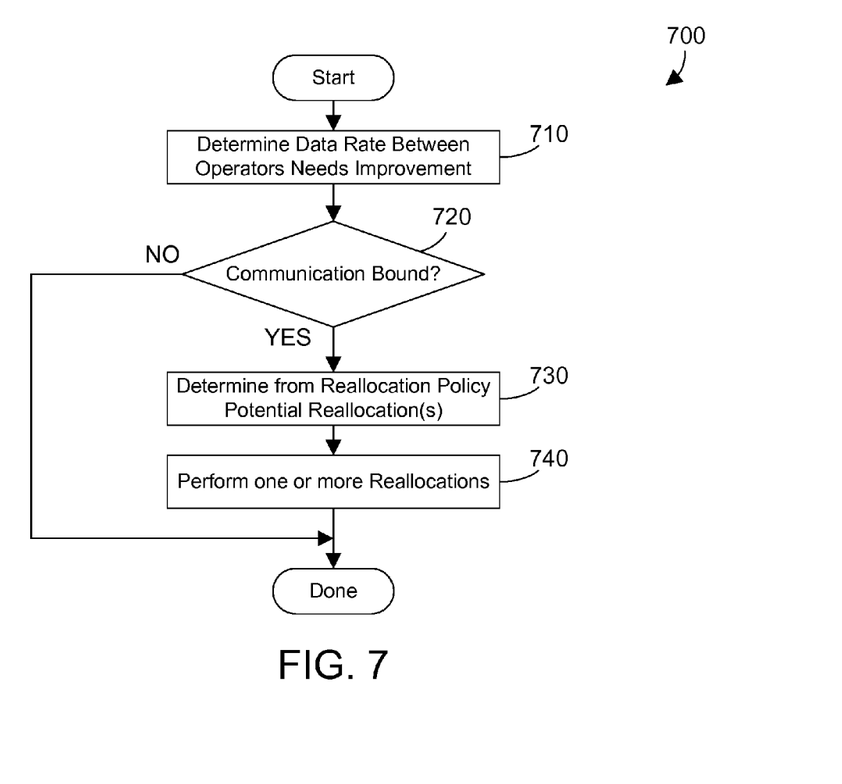
FIG. 7 is a flow diagram of a method for performing one or more reallocations when the data rate between operators needs improvement.

Referring to FIG. 7, a method 700 begins when it is determined the data rate between operators needs improvement (step 710). When the operator graph is connection bound (step 720=YES), determine from the reallocation policy one or more potential reallocations (step 730), then perform one or more of the reallocations (step 740). When the operator graph is not communication bound (step 720=NO), steps 730 and 740 are bypassed.

Referring back to the operator graph 400 in FIG. 4, we now assume for a different example the Functor operator 440 is performing some storage-intensive processing on incoming words. Many data processing algorithms not only use CPU and memory, but also use large cache files on local disk. Disk speed can be a major contributor to bottlenecks in an operator graph such as the operator graph 400 shown in FIG. 4. We assume the Functor operator 440 becomes a bottleneck due to the frequency of accesses to disk to access large cache files. The Split operator 430 will experience back pressure. Once the back pressure fills the buffers in the Split operator 430, processing in the Functor operator 420 will begin to back up. At that time, no downstream operators will receives words, even though they are not busy.

When the operator graph analysis mechanism determines there is disk contention or excessive cache misses contributing to the bottleneck, the reallocation policy 300 in FIG. 3 is read to determine potential reallocations. One alternative is to move the cache to a local solid state drive (SSD), which has an access time much faster than traditional disk drives. In the prior art, SSD storage is used to eliminate bottlenecks within a single system based on data access patterns. In this disclosure, an SSD may be used for data caching and storage, without regard to data access patterns, based on the flow or lack of flow of data through an operator graph. Another alternative is to move the cache to a high speed storage area network (SAN), again improving the access time to the cache. Yet another alternative is to move the cache to an in-memory file system, again improving access time to the cache. Still another alternative is to reduce the number of accesses to the cache by allocating more CPUs and/or memory to Functor operator 440. The operator graph analysis mechanism will choose one or more of these alternatives, and will perform reallocation to improve the performance of the application.

Figure 8:
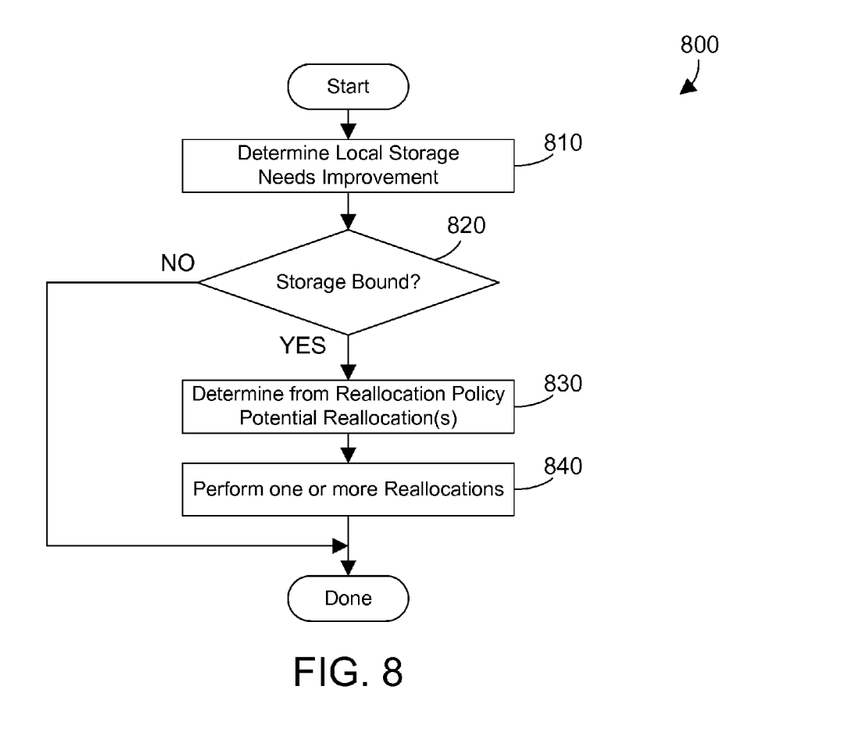
FIG. 8 is a flow diagram of a method for performing one or more reallocations when local storage needs improvement.

Referring to FIG. 8, a method 800 begins by determining local storage needs improvement (step 810). This determination can be made, for example, by monitoring disk contention and/or cache misses. When an operator is storage bound (step 820=YES), determine from the reallocation policy potential reallocations (step 830), and perform one or more of those reallocations (step 840). When the operator is not storage bound (step 820=NO), steps 830 and 840 are bypassed.

While the specific examples herein relate to stream processing, the principles herein apply equally to any application or program type that can be represented in an operator graph, whether currently known or developed in the future. In addition, the reallocations discussed herein are particularly useful in a distributed processing environment that supports dynamic resource allocation as an application runs.

The disclosure and claims are directed to an operator graph analysis mechanism that analyzes an operator graph corresponding to an application for problems as the application runs, and determines potential reallocations from a reallocation policy. The reallocation policy may specify potential reallocations depending on whether one or more operators in the operator graph are compute bound, memory bound, communication bound, or storage bound. The operator graph analysis mechanism includes a resource reallocation mechanism that can dynamically change allocation of resources in the system at runtime to address problems detected in the operator graph. The operator graph analysis mechanism thus allows an application represented by an operator graph to dynamically evolve over time to optimize its performance at runtime One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for improving performance of an application at runtime, the method comprising the steps of:
   (A) displaying an operator graph that represents the application using a plurality of operators and a plurality of data flows between the plurality of operators;
   (B) analyzing the operator graph at runtime when the application runs;
   (C) detecting at least one problem in the operator graph based on at least one data bottleneck in the operator graph;
   (D) performing at least one resource reallocation to improve performance of the application represented in the operator graph; and
   (E) specifying by a user a reallocation policy that specifies a plurality of problems and corresponding potential reallocations to perform to address the plurality of problems, wherein the plurality of problems comprise compute bound and memory bound, wherein step (D) selects the at least one resource reallocation from the potential reallocations in the reallocation policy.

2. The method of claim 1 wherein step (D) comprises allocating at least one hardware resource.

3. The method of claim 1 wherein step (D) comprises allocating at least one operating system resource.

4. The method of claim 1 wherein the plurality of problems further comprises communication bound and wherein step (D) comprises allocating at least one network resource.

5. The method of claim 1 wherein the plurality of problems further comprises storage bound and wherein step (D) comprises allocating at least one storage resource.

6. The method of claim 5 wherein the allocating of the at least one storage resource comprises allocating a local cache to a solid state drive.

7. A computer-implemented method executed by at least one processor for improving performance of an application at runtime, the method comprising the steps of:
displaying an operator graph that represents the application using a plurality of operators and a plurality of data flows between the plurality of operators;
analyzing the operator graph at runtime when the application runs;
detecting at least one problem in the operator graph based on at least one data bottleneck in the operator graph;
when the at least one problem includes a first operator in the operator graph that is compute bound, performing at least one of the steps:
increasing priority of processing the first operator;
allocating additional CPUs to the first operator;
increasing clock frequency for at least one CPU in the first operator;
using a simplified, less accurate algorithm in the first operator;
using an algorithm that uses more memory in the first operator;
when the at least one problem includes a second operator in the operator graph that is memory bound, performing at least one of the steps:
allocating additional memory to the second operator; and
using an algorithm for the second operator that uses more CPU;
when the at least one problem includes a third operator in the operator graph that is communication bound with respect to a fourth operator, performing at least one of the steps:
increasing bandwidth of a network connection between the third operator and the fourth operator;
allocating a dedicated link between the third operator and the fourth operator;
moving one of the third and fourth operators to a different node; and
changing processing of the third and fourth operators to balance network traffic;
when the at least one problem includes a fifth operator that is storage bound, performing at least one of the steps:
allocating a solid state drive to the fifth operator, and moving a cache in the fifth operator to the solid state drive;
allocating a storage area network to the fifth operator, and moving the cache in the fifth operator to the storage area network;
allocating an in-memory file system to the fifth operator, and moving the cache in the fifth operator to the in-memory file system;
allocating additional CPUs in the fifth operator to reduce usage of the cache; and
allocating additional memory in the fifth operator to reduce usage of the cache.

* * * * *